US011451605B2

(12) United States Patent
Asarikuniyil et al.

(10) Patent No.: US 11,451,605 B2
(45) Date of Patent: *Sep. 20, 2022

(54) METHOD TO INSERT PROGRAM BOUNDARIES IN LINEAR VIDEO FOR ADAPTIVE BITRATE STREAMING

(71) Applicant: DIRECTV, LLC, El Segundo, CA (US)

(72) Inventors: Binny Asarikuniyil, Cerritos, CA (US); Kiran Vokkarne, Redondo Beach, CA (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,537

(22) Filed: Jan. 7, 2021

(65) Prior Publication Data
US 2021/0136136 A1 May 6, 2021

Related U.S. Application Data

(63) Continuation of application No. 15/189,202, filed on Jun. 22, 2016, now Pat. No. 10,944,806.

(51) Int. Cl.
*G06F 15/16* (2006.01)
*H04L 65/70* (2022.01)
(Continued)

(52) U.S. Cl.
CPC ............ *H04L 65/70* (2022.05); *H04L 65/612* (2022.05); *H04L 65/762* (2022.05); *H04L 65/80* (2013.01);
(Continued)

(58) Field of Classification Search
CPC . H04L 65/4084; H04L 65/602; H04L 65/607; H04L 65/80; H04L 67/02; H04L 67/10; H04L 67/42; H04L 69/24
See application file for complete search history.

(56) References Cited

U.S. PATENT DOCUMENTS 8,136,140 B2 3/2012 Hodge et al.
8,326,127 B2 * 12/2012 Casagrande ......... G11B 27/105
386/278

(Continued)

FOREIGN PATENT DOCUMENTS

CA 2847447 A1 9/2010

OTHER PUBLICATIONS

"Boundary Point Specification", OpenCable™ Specifications Encoder, cablelabs.com, OC-SP-EBP-I01-130118, Jan. 18, 2013, pp. 1-31.
(Continued)

*Primary Examiner* — Chris Parry
*Assistant Examiner* — Dixon F Dabipi
(74) *Attorney, Agent, or Firm* — Hanley, Flight & Zimmerman, LLC

(57) ABSTRACT

Aspects of the subject disclosure may include, for example, a system for indicating a program boundary in an adaptive bitrate media stream, where the system includes a memory and a processor that performs operations including generating multiple transcoded media output streams of different bit rates from an input linear media stream, fragmenting the multiple transcoded media output streams into chunks, detecting a program boundary in the input linear media stream, and supplying a program change indicator in a manifest file for implementing program change features in mobile communication devices. Other embodiments are disclosed.

20 Claims, 6 Drawing Sheets

(51) Int. Cl.
*H04L 67/10* (2022.01)
*H04L 67/02* (2022.01)
*H04L 69/24* (2022.01)
*H04L 65/80* (2022.01)
*H04L 65/612* (2022.01)
*H04L 65/75* (2022.01)
*H04L 67/01* (2022.01)

(52) U.S. Cl.
CPC .............. *H04L 67/01* (2022.05); *H04L 67/02* (2013.01); *H04L 67/10* (2013.01); *H04L 69/24* (2013.01)

(56) References Cited

U.S. PATENT DOCUMENTS

| | | | |
|---|---|---|---|
| 8,407,735 | B2 | 3/2013 | Casagrande et al. |
| 8,437,617 | B2 | 5/2013 | Casagrande et al. |
| 8,572,639 | B2* | 10/2013 | Ficco .................... H04N 7/163 725/14 |
| 8,848,109 | B2 | 9/2014 | Pornprasitsakul et al. |
| 9,190,111 | B2 | 11/2015 | Yang |
| 9,215,080 | B2 | 12/2015 | Li |
| 9,246,741 | B2 | 1/2016 | Eswaran |
| 9,277,251 | B2 | 3/2016 | Kummer |
| 9,332,296 | B2 | 5/2016 | Ma |
| 9,344,748 | B2 | 5/2016 | Lam |
| 9,414,100 | B2* | 8/2016 | Van Veldhuisen ........................... H04N 21/23655 |
| 10,027,997 | B2* | 7/2018 | Mutton .......... H04N 21/234309 |
| 10,944,806 | B2 | 3/2021 | Asarikuniyil et al. |
| 2004/0010613 | A1 | 1/2004 | Apostolopoulos et al. |
| 2005/0203927 | A1 | 9/2005 | Sull et al. |
| 2006/0256852 | A1 | 11/2006 | Prakash et al. |
| 2009/0080852 | A1 | 3/2009 | Peters et al. |
| 2009/0133093 | A1* | 5/2009 | Hodge ............... H04N 21/4325 725/137 |
| 2009/0282162 | A1 | 11/2009 | Mehrotra et al. |
| 2012/0096486 | A1 | 4/2012 | Stallard et al. |
| 2012/0210222 | A1* | 8/2012 | Matsuda ................ G06F 3/048 715/716 |
| 2014/0281996 | A1 | 9/2014 | Paulraj et al. |
| 2015/0201012 | A1 | 7/2015 | Shaffer |
| 2015/0288732 | A1 | 10/2015 | Phillips |
| 2015/0324379 | A1 | 11/2015 | Danovitz et al. |
| 2016/0073175 | A1 | 3/2016 | Philips |
| 2017/0374123 | A1 | 12/2017 | Asarikuniyil et al. |

OTHER PUBLICATIONS

"Recommended Practice for SCTE 35 Digital Program Insertion Cueing Message for Cable", Society of Cable Telecommunication Engineers, scte.org, ANSI/SCTE 67, 2014, pp. 1-80.

"SCTE35 ESAM Test Stream Suite", Sencore, sencore.com, accessed May 2016, 1 page.

Brassil, Jack et al., "Large-Scale Personalized Video Streaming with Program Insertion Proxies", HP, hpl.hp.com, Sep. 27, 2004, pp. 1-11.

United States Patent and Trademark Office, "Non-final Office Action," issued in connection with U.S. Appl. No. 15/189,202, dated Apr. 10, 2018, 29 pages.

United States Patent and Trademark Office, "Final Office Action," issued in connection with U.S. Appl. No. 15/189,202, dated Nov. 28, 2018, 31 pages.

United States Patent and Trademark Office, "Non-final Office Action," issued in connection with U.S. Appl. No. 15/189,202, dated Aug. 22, 2019, 33 pages.

United States Patent and Trademark Office, "Final Office Action," issued in connection with U.S. Appl. No. 15/189,202, dated Mar. 9, 2020, 32 pages.

United States Patent and Trademark Office, "Notice of Allowance and Fee(s) Due," issued in connection with U.S. Appl. No. 15/189,202, dated Nov. 12, 2020, 10 pages.

* cited by examiner

```
                   210
   220      ┌─
     ┌─      #EXTM3U                                        230
            #EXT-X-TARGETDURATION:10                   ┌─
   240      #EXT-X-KEY:METHOD=AES-128,URI="enc.key"
     ┌─     #EXTINF:10,
   245      101.ts
            #EXTINF:10,
            102.ts
   265      #EXTINF:6,
     ┌─     103.ts
   260
   250      #EXT-X-PROGRAM-CHANGE:time=1449769931
            //Indicates a program change
   275      #EXTINF:4,
   270      104.ts
            #EXTINF:10,
            105.ts
            #EXTINF:10,
            106.ts
            #EXTINF:10,
            107.ts
            #EXTINF:10,
            108.ts
```

METHOD TO INSERT PROGRAM BOUNDARIES IN LINEAR VIDEO FOR ADAPTIVE BITRATE STREAMING

CROSS REFERENCE TO RELATED APPLICATIONS

This application is a continuation of U.S. patent application Ser. No. 15/189,202 filed on Jun. 22, 2016. The contents of each of the foregoing is/are hereby incorporated by reference into this application as if set forth herein in full.

FIELD OF THE DISCLOSURE

The subject disclosure relates to a method to insert program boundaries of linear video and other media for adaptive bitrate streaming.

BACKGROUND

Detecting a program boundary in a linear video has been done on the traditional broadcast/cable videos using set top box and other technologies. It is critical for a streaming video application to enforce features like parental control, blackout, sponsored data, etc., even on mobile devices. Thus, the accuracy of program boundary becomes critical for providing such features. Program boundary detection is implemented by comparing clock time of the media stream and assuming that programs begin/end at scheduled times, which is quite unsatisfactory. Due to potential issues with clock synchronization, or content delivery network latency, program boundaries during playback of programs may not precisely occur when scheduled, i.e., typically on the hour or half-hour. The program boundary may be off by several seconds or potential off for few minutes, thereby preventing precise implementation of programming rules, such as parental controls, which may either be enforced early or late, potentially causing discomfort to subscribers.

BRIEF DESCRIPTION OF THE DRAWINGS

Reference will now be made to the accompanying drawings, which are not necessarily drawn to scale, and wherein:

FIG. 2 depicts an illustrative embodiment of a manifest file;

DETAILED DESCRIPTION

The subject disclosure describes, among other things, illustrative embodiments for supplying a program change indicator in a manifest file for an adaptive bitrate streaming paradigm, to implement program change features in mobile communication devices. Other embodiments are described in the subject disclosure.

One or more aspects of the subject disclosure include a system for indicating a program boundary in an adaptive bitrate media stream, where the system includes a memory and a processor that performs operations including generating multiple transcoded media output streams of different bit rates from an input linear media stream, fragmenting the multiple transcoded media output streams into chunks, detecting a program boundary in the input linear media stream, and supplying a program change indicator in a manifest file for implementing program change features in mobile communication devices.

One or more aspects of the subject disclosure include a machine-readable storage medium with executable instructions that, when executed by a processor of a media player, facilitate performance of operations, including requesting media content for display by the media player, receiving a manifest file for an adaptive bitrate media stream of the media content, measuring an available bandwidth for downloading data from a content delivery network, requesting a chunk of the media content identified by a uniform resource identifier in the manifest file based on the available bandwidth, receiving the chunk from the content delivery network, detecting a program change indicator for the chunk in the manifest file, and displaying the chunk of the media content.

One or more aspects of the subject disclosure include a process that includes detecting, by a system comprising a processor, a program boundary in an input linear media stream, generating, by the system, a manifest file comprising metadata that identifies uniform resource identifiers for downloading chunks of a transcoded media output stream, wherein chunks are fragments of the transcoded media output stream, wherein the transcoded media output stream comprises a bit rate that is generated from the input linear media stream, and wherein each chunk comprises a fixed display time, inserting, by the system, a program change indicator into the manifest file that identifies the program boundary in a chunk, and sending, by the system, the manifest file to a media player.

Figure 1:
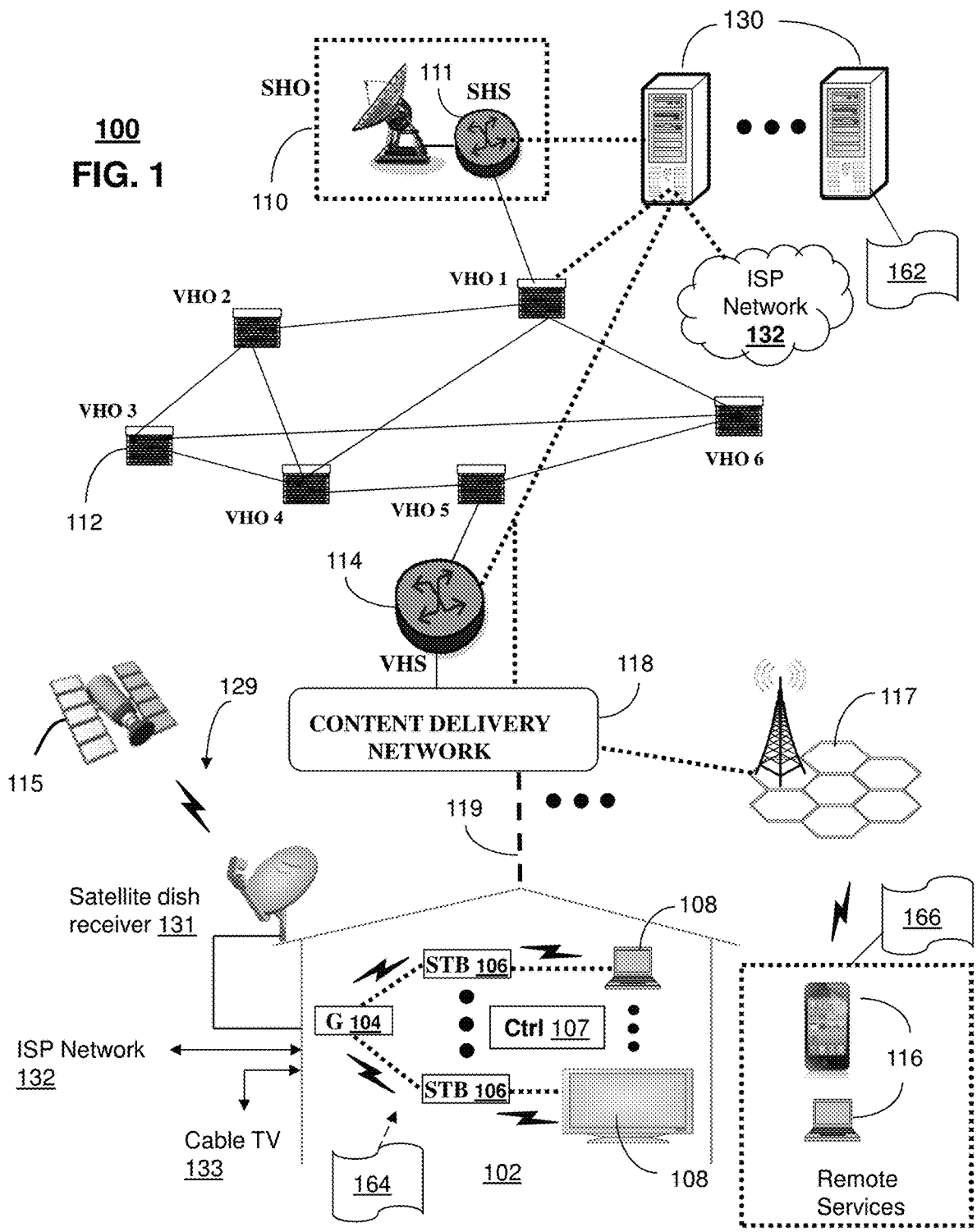
FIG. 1 depicts illustrative embodiments of communication systems that provide media services.

FIG. 1 depicts an illustrative embodiment of a communication system 100 for delivering media content. The communication system 100 can represent an Internet Protocol Television (IPTV) media system. One or more devices illustrated in the communication system 100 of FIG. 1 can generate several parallel segments of media content having different bitrates and a small duration sufficient to support an adaptive bitrate streaming paradigm. The one or more devices illustrated in the communication system 100 of FIG. 1 can also create a playlist file for a media player to use to download and stream the media content from a content delivery network. By examining input linear media content, the one or more devices illustrated in the communication system 100 of FIG. 1 can detect a program boundary in the input linear media content and provide an indication in the playlist file denoting the program boundary, as described in more detail below.

The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via a content delivery network 118 to commercial and/or residential buildings 102 housing a gateway 104 (such as a residential or commercial gateway). The content delivery network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) Network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services. Communication system 100 enables various types of interactive television and/or services including IPTV, cable and/or satellite.

The subject disclosure can apply to other present or next generation over-the-air and/or landline media content services system.

Multiple forms of media services can be offered to media devices over landline technologies such as those described above. Additionally, media services and multimedia broadcast content can be offered to media devices Additionally, the VHS 114 can distribute multimedia broadcast content to wireless communication devices 116 via a content delivery network 118 by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Some of the network elements of the IPTV media system can be coupled to one or more computing devices 130, a portion of which can operate as a web server for providing web portal services over the ISP Network 132 to wireline media devices 108 or wireless communication devices 116.

Communication system 100 can also provide for all or a portion of the computing devices 130 (herein referred to as transcoder 130) to provide media preparation services for media content received by SHS 111 for distribution to VHS 114. The transcoder 130 can use computing and communication technology to perform function 162, which can include among other things, transcoding, fragmenting, or manifest generating functions desirable in an adaptive bitrate streaming paradigm.

In an exemplary adaptive bitrate streaming paradigm, may be used to process input linear media stream of media content received from satellite and/or terrestrial communication systems. Such processing may be implemented by a real-time transcoder or an on demand just-in-time transcoder. The transcoders convert whole content streams in to multiple streams at different bit rates. For example, an transcoder may take an MPEG stream (e.g., MPEG-2/MPEG-4) or a stored MPEG stream (e.g., MPEG-2/MPEG-4), encoding it digitally, encapsulating it in to MPEG-2 single program transport streams (SPTS) multiple bit rates formats, and preparing the encapsulated media for distribution by the content delivery network 118. As another example, a live stream may be encoded into multiple transport streams, each having a different bit rate. The live stream may be a broadcast of multimedia content from a content provider, received by SHS 111. The live stream is transcoded into multiple transport streams, each having a different bit rate. The stored stream may be on demand content, for example.

Next, transcoder 130 can divide the resultant multiple transport streams into a series of fragments of a finite duration, known as "chunks." For example, MPEG streams may be divided into a series of 2-3 second chunks with multiple wrappers for the various adaptive streaming formats (e.g., Microsoft Smooth Streaming, APPLE HLS). The resultant adaptive bit rate media segments are known as chunk files. The transcoder 130 may support profiles from the MPEG DASH (Dynamic Adaptive Streaming over HTTP) format, which is a standardized adaptive streaming specification that has been developed as an industry standard by MPEG. This system could be implemented in MPEG DASH without any special logic in the client and most likely in existing proprietary adaptive bit rate schemes.

The transcoder 130 may be configured to perform segmentation/chunking for either all output adaptive bit rate formats or a subset of the output adaptive bit rate streaming formats. The playback duration of each chunk may be different for each adaptive bit rate format, but all will have to be an integer multiple of the group of pictures (GOP) size or key frame intervals. However, for a given adaptive bit rate format, the chunk durations will be the same for all streams in an output stream group. In an alternative embodiment, transcoder 130 can encrypt each chunk using a content key, to maintain digital rights management (DRM) requirements.

In addition, transcoder 130 can generate a manifest file that represents a playlist. The playlist can be a manifest file that lists information for downloading the chunk files bearing the multimedia content from storage locations in content delivery network 118. By way of a non-limiting example, the manifest file can comprise a uniform resource identifier (URI) for each chunk file of the multimedia content, such as a uniform resource locator (URL) or path/filename where the chunk file may be downloaded. If encrypted, the manifest file can also comprise a URI for retrieval of a content key used to decrypt the fragments of the multimedia content.

The transcoder 130 may support ad-insertion, blackout/content substitution, and enforcement of parental rights via playlist manipulation. The actual playlist manipulation may or may not be performed by the transcoder 130. In an embodiment, the transcoder may examine the input linear media stream to detect where a program boundary occurs. The transcoder 130 may insert a program change indicator into the manifest file that identifies where the program boundary occurs within a particular chunk. The program change time indicator may denote an amount of elapsed media render time, from the beginning of the chunk, when the program boundary occurs. The program change time indicator may also or alternatively denote the amount of media render time remaining before the end of the chunk, after the program boundary. In addition, the transcoder may include a total duration of play time for the chunk. In an alternative embodiment, the transcoder 130 may divide the chunk at the program boundary, thereby creating two smaller chunks, and provide the program change indicator in the manifest file between the data identifying each of the two smaller chunks.

After processing, the adaptive bit rate stream chunk files and/or respective manifest files are published to downstream servers, such as VHS 114, for streaming the chunk files to clients upon request. The chunk files may be delivered using common Internet protocols, namely HTTP over TCP/IP, a robust and reliable transfer protocol in which clients request content segments and web servers respond accordingly. Thus, within an embodiment of an adaptive bit rate system, knowledge of all content segments delivered and to whom they are delivered can be provided for use in network-based viewership monitoring and sponsorship tracking.

The transcoder 130 may also facilitate adaptive bit rate streaming of video and audio to multi-screen video (MSV) clients. The functions provided by transcoder 130 may be a software element residing on servers 130, VHS 114, or may co-exist with any HTTP server or streaming edge servers in content delivery network 118, or may be a standalone appliance. Further, transcoder 130 may optionally have a built-in content delivery network interface or an HTTP server interface such that it can support clients directly. Direct support of clients may be limited to VoD and networked digital video recorder (nDVR) type applications.

Logic in the content delivery network 118 stores the chunk files according to an internal heuristic logic algorithm, determining whether and where to store the content. For example, more popular content may be stored in local storage to decrease network bandwidth usage and increase access speed. Less popular content may be stored in a central repository to reduce costs for fast storage. For example, content that may be stored includes VoD and nDVR content. Live broadcast, non-DVR content chunk files may be distributed by the content delivery network but only stored temporarily to facilitate distribution.

Communication system 100 may illustratively implement, for example, one or more open or proprietary protocols for adaptive bit rate streaming such as HTTP Live Streaming (HLS), SecureMedia's Encryptonite One HLS+ solution, Microsoft Smooth Streaming, HTTP Dynamic Streaming, Dynamic Adaptive Streaming over HTTP (DASH), HTTP Smooth Streaming (HSS), and the like. The transcoder 130 converts one or more multi-bit rate streams of an input stream group into logical files formatted for a particular output streaming format such as HLS, HDS, HSS or DASH. In HSS, HDS and DASH all of the chunks associated with a given format and bit rate are stored within the same file. In HLS however, each chunk is stored in its own file. So assuming two second chunks, three bitrates and a 30 minute program, the transcoder 130 will create three HSS files but 2700 HLS files. The transcoder may be capable of creating multiple formats simultaneously. Each format to be generated is specified by a profile. Apple HLS breaks the whole content stream in to a sequence of small HTTP based file downloads. As the stream is played, the client selects from a number of different bit rate streams based on the client CPU and bandwidth. Microsoft HSS is a media services extension to enable adaptive streaming of media to clients over HTTP, using a concept of delivering small content fragments (e.g., 2 seconds video) and verifying that each has arrived within appropriate time and playback at the expected quality level. Overall quality with adaptive bit rate may be the best possible for a given user's network connection, thereby maximizing the quality of experience.

The transcoding, fragmenting, and manifest generating function 162 techniques of transcoder 130 are described below in method 300 of FIG. 3. The media processors 106 and wireless communication devices 116 can be provisioned with software functions 164 and 166, respectively, to stream media content prepared by the transcoder 130. For instance, functions 164 and 166 of media processors 106 and wireless communication devices 116 can be similar to the functions described for the wireless communication devices 116 in accordance with method 400 described below.

FIG. 2 depicts illustrative embodiments of a manifest file 200. As shown in FIG. 2, manifest file 200 comprises a series of lines of text, including a file header directive 210, a target duration tag 220, a decryption key tag 230, a track information directive 240, a media segment URI 245, and a program change indicator 250.

As shown in FIG. 2, the file header directive 210 indicates that the exemplary manifest file conforms to an extended multimedia playlist (m3u) format. Media segments are sequentially listed in manifest file 200.

The target duration tag 220 specifies the maximum duration of a media segment when rendered by a media player.

The decryption key tag 230 specifies how to decrypt the media segments. The decryption key tag 230 applies to every media segment that appears between it and the next decryption key tag in the manifest file. The decryption key tag 230 includes attributes for an encryption method and a URI that specifies how to obtain the decryption key.

The track information directive 240 comprises a runtime length of the media segment, usually expressed in seconds, and optionally a title. The track information directive 240 of each media segment in the manifest file, when rounded to the nearest integer, must be less than or equal to the value specified by the target duration tag 220.

The media segment URI 245 identifies the next track for the media player to render. The media segment URI 245 provides a location where each chunk file, such as 101.ts, 102.ts, etc., may be downloaded. In this example, a local pathname, relative to the M3U manifest file location, is specified, rather than a full URL for the media segment URI 245.

The program change indicator 250 indicates when a program change occurs. In this example, a media segment of 10 second duration was fragmented into two separate chunk files at the program boundary. The program change indicator 250 may include a timestamp indicating a schedule time for the program boundary. A media segment URI 260 for a first chunk file, 103.ts, now has a duration of 6 seconds, as indicated by track information directive 265. A media segment URI 270 for a second chunk file, 104.ts, has a duration of 4 seconds, as indicated by track information directive 275. The program change indicator 250 is inserted before the track information directive 275 for the second chunk file, and expressly indicates a program change begins with the next chunk file identified by the media segment URI 270 listed in the manifest file 200. The first portion of the media segment, chunk file 103.ts, is adjusted to accurately match the program change, i.e., the last 4 seconds of content corresponding to the subsequent program that is removed from the chunk file. The track information directive 265 (which was originally 10 seconds) is adjusted to indicate that the media segment duration time is 6 seconds.

Figure 3:
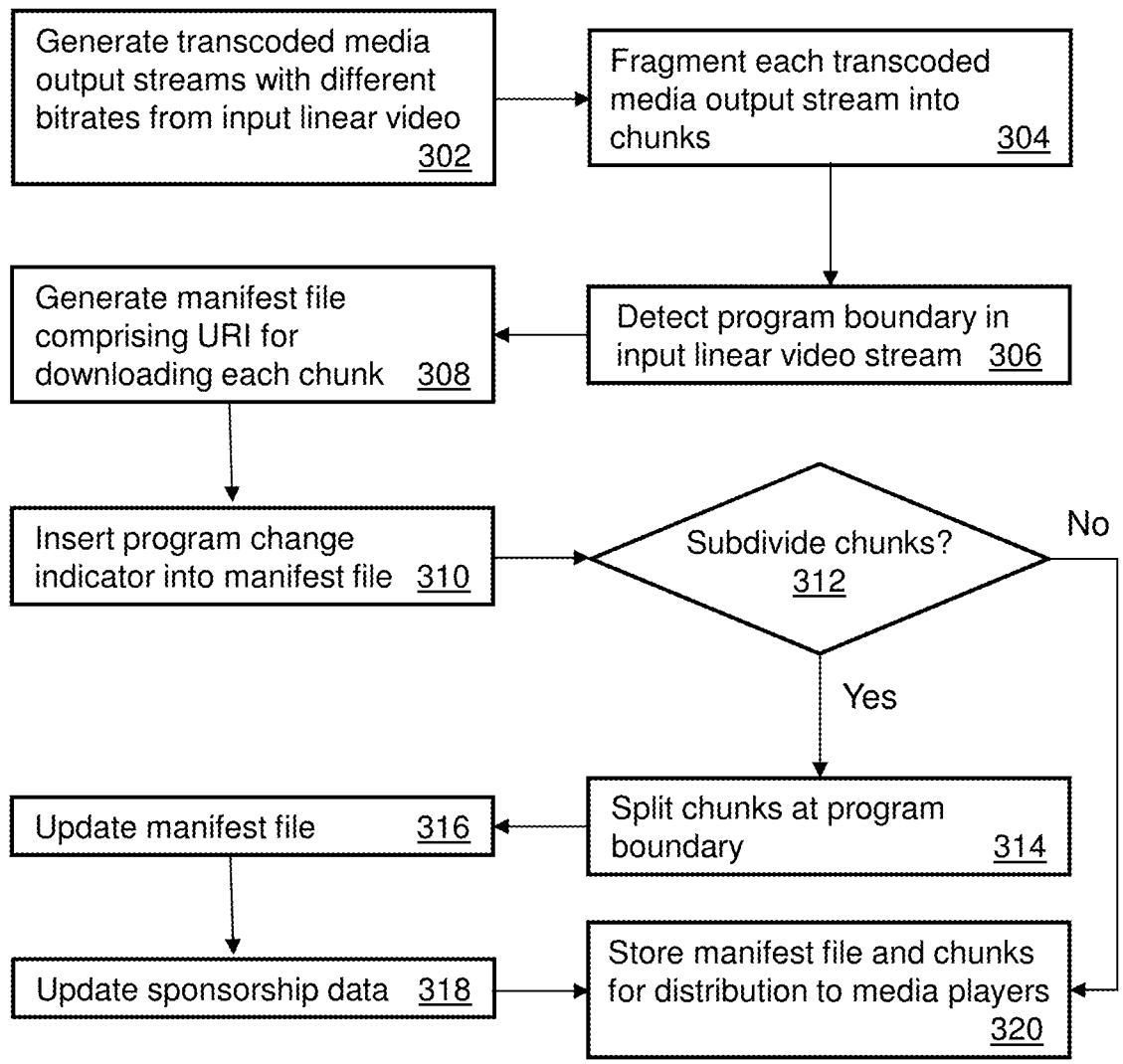
FIG. 3 depicts an illustrative embodiment of a method used by a system to prepare streaming media content described in FIG. 1.

FIG. 3 depicts an illustrative embodiment of a method used by transcoder 130 to perform transcoding, fragmenting, and manifest generating function 162, used in an adaptive bitrate streaming paradigm. In more detail, as illustrated by FIG. 3, in step 302, transcoder 130 generates a plurality of transcoded media output streams, for example, from an input linear media, where each stream has a different bitrate from the other streams, to support the adaptive bitrate streaming paradigm.

Next, in step 304, transcoder 130 fragments each transcoded media output stream into a series of chunk files. The chunk files are usually kept small in size and have a short (2-10 second) duration. Typically, the chunk files from every transcoded media output stream have the same duration, so that switching between streams is easily achieved since each chunk file from a first transcoded media output stream has a corresponding chunk file in all the other transcoded media output streams comprising the same content.

Next in step 306, the transcoder detects a program boundary in the input linear media stream. Program boundary detection can be achieved in a variety of ways, including black frame detection, significant audio pause, facial recognition, embedded audio cues, digital watermarks, programming guides, text analysis, or the like.

Then, in step 308, the transcoder 130 generates a manifest file that includes the media segments that will be rendered by a media player, in other words, a list of the chunks for a particular bitrate of the media stream. The transcoder 130 may optionally include the metadata described in FIG. 2. In particular, the transcoder 130 may include metadata that specifies the duration of the media segment rendered from the chunk.

Next, in step 310, the transcoder 130 inserts a program change indicator into the manifest file that shows where a program change occurs in a particular chunk. The program change indicator may be inserted before the listing for the chunk where the program boundary occurs, so that the media player receiving the manifest file can easily implement rule-based actions that may occur at the program boundary, as described below.

Next, in step 312, the transcoder 130 determines whether to subdivide a chunk when a program boundary occurs within the chunk. Chunk subdivision may help to enforce rules that may or may not be implemented by a media player, since rendering of media content can be inhibited by the content delivery network squelching delivery of chunks, rather than relying solely on the media player to enforce rules. If chunk subdivision is not implemented, then the process continues at step 320 below.

If chunk subdivision is implemented, then the process continues at step 314, where transcoder 130 splits a chunk at the program boundary. A copy of the second portion of the media segment after the program boundary is copied into a new chunk, and the split chunk is truncated at the program boundary, leaving the first portion of the media segment belonging to the first program in the split chunk. This process is repeated for every other chunk from the other transcoded media output streams having a program boundary that occurs within the chunk.

Next, in step 316, the transcoder 130 updates the manifest file to list the split chunk and the new chunk. In addition, the transcoder 130 adjusts the metadata to accurately match the effect of removing media content following the program change, and the addition of the new chunk, by including information such as the amount of time from the beginning of the chunk to the program boundary.

Next, in step 318, the transcoder 130 updates any sponsorship data in the network for the new chunks. Sponsorship may be tracked by the content delivery network tallying downloads of chunk files, and the duration of such chunk files. The duration of the new chunks will be counted as sponsored, thereby preventing a loss of sponsorship revenue for the first chunk of the second program stream.

In step 320, the manifest file and chunk files generated are sent for storage in a content delivery network. As described above, the content delivery network is responsible for sending the chunk files upon request, typically by a HTTP GET request, from a media player. Alternatively, the manifest file and chunk files may be sent for temporary storage in the content delivery network, or sent directly to the media player streaming the program.

Figure 4:
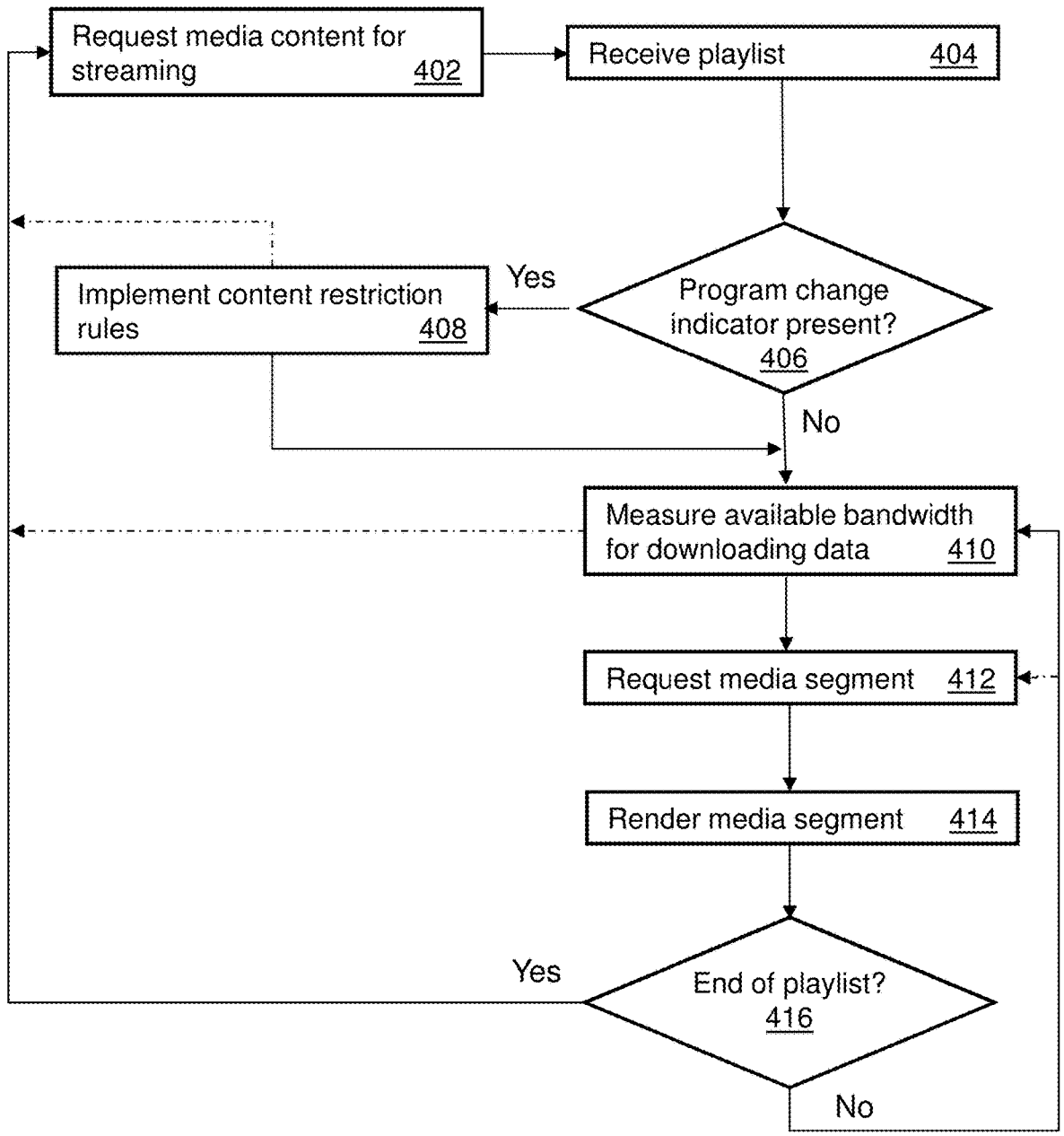
FIG. 4 depicts an illustrative embodiment of a method used by a system to stream media content described in FIG. 1.

FIG. 4 depicts an illustrative embodiment of a method used by wireless communication device 116 to implement an adaptive bitrate streaming function 166 to stream media content. As shown in FIG. 4, in step 402 wireless communication device 116 makes a request for streaming media content. The request can be formulated through services such as VoD, nDVR, browsing an EPG, or other infrastructure services provided by a content delivery network, or through links obtained from the Internet, and may be implement by a media player adapted to implement adaptive bitrate streaming function 166.

Next, in step 404, the wireless communication device 116 receives a playlist for streaming the media content. As described above, the playlist is a manifest file that provides a listing of media segments for a media player on the wireless communication device 116 to render.

Next, in step 406, the wireless communication device 116 examines the playlist to determine whether a program change indicator is present. If there is no program change indicator, then the process continues with step 410 described below. If there is a program change request, then the process continues with step 408.

In step 408, the wireless communication device 116 may determine whether a content restriction rule must be implemented regarding media content associated with the next program following the program break. For example, the wireless communication device 116 may stream alternate media, such as an advertisement or sponsored media in the place of a blacked out media program. As shown in FIG. 4, in such event the process may continue back to step 402, where the request for alternative media would be lodged. The wireless communication device 116 can precisely enforce such rules at the end of a current program and before the blackout screen. The benefit of such precision lies in the ability to generate additional revenue by selling blackout programming periods for advertisements or featured/sponsored media. As another example, parental controls settings may be more precisely enforced by a media player application on the wireless communication device 116.

In step 410, the wireless communication device 116 measures available bandwidth, i.e., the data communications rate, with the content delivery network. The available bandwidth to download chunk files and other factors, such as the processing capacity of wireless communication device 116, are used to determine the bitrate of the media stream that should be delivered to the wireless communication device 116. Such determination can be implemented by either the wireless communication device 116, or devices in the content delivery network. Should a change become necessary, as shown in FIG. 4, the process may optionally continue back to step 402, where the request for media content having a different bitrate would be lodged.

In step 412, the wireless communication device 116 requests one or more media segments found in the playlist. For example, the wireless communication device 116 may submit a HTTP GET request to download a chunk using a URL specified in the playlist from a server in the content delivery network.

In step 414, the wireless communication device 116 renders the media segment in the chunk downloaded from the content delivery network. If the program boundary occurs in the chunk, then the media player application on the wireless communication device 116 may enforce any content restriction rules, as described in step 408, for content in the chunk beyond the program boundary.

In step 416, the wireless communication device 116 tests whether the end of the playlist has been reached. If not, then the process continues back to step 410. Alternatively, the process may continue back to step 412, depending upon the frequency of testing available bandwidth and adjusting downloads. If the end of the playlist has been reached, then the process returns to step 402.

While for purposes of simplicity of explanation, the respective processes are shown and described as a series of blocks in FIGS. 3 and 4, it is to be understood and appreciated that the claimed subject matter is not limited by the order of the blocks, as some blocks may occur in different orders and/or concurrently with other blocks from what is depicted and described herein. In addition, any devices enumerated in connection with FIG. 1 may be used to implement the functions 162-166 described in FIGS. 3 and 4 besides the exemplary devices described therein. Moreover, not all illustrated blocks may be required to implement the methods described herein.

Figure 5:
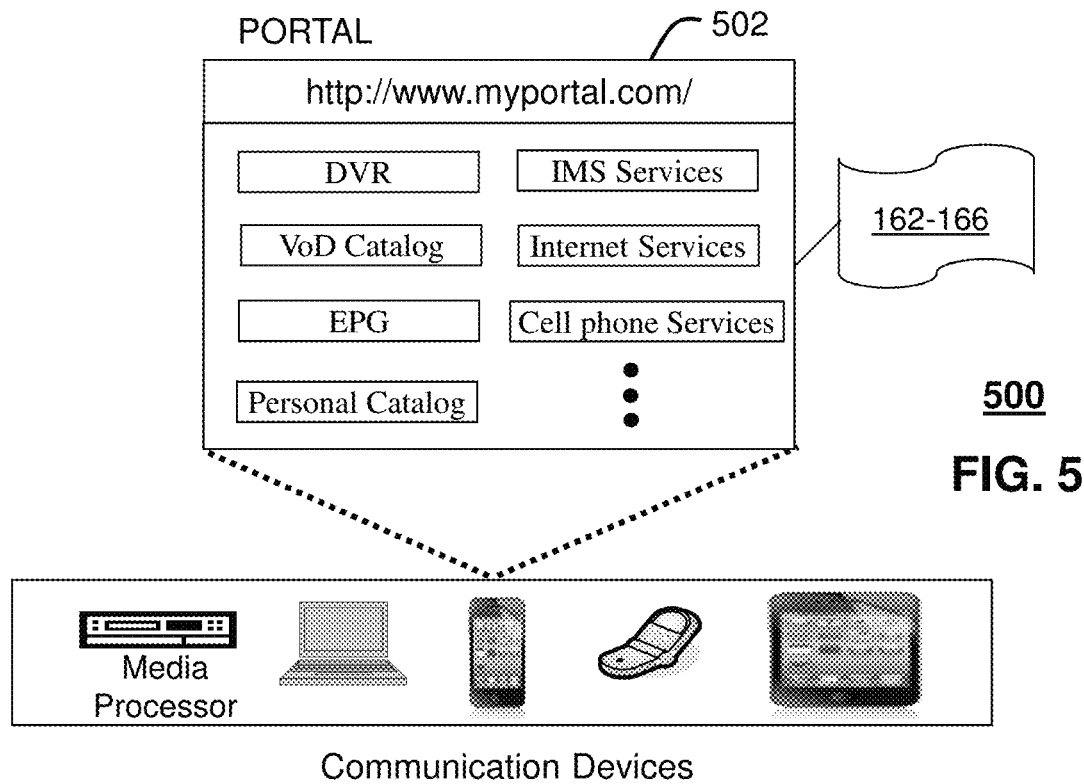
FIG. 5 depicts an illustrative embodiment of a web portal for interacting with the communication systems of media content providers.

FIG. 5 depicts an illustrative embodiment of a web portal 502 of a communication system 500. Communication system 500 can be overlaid or operably coupled with communication system 100, as another representative embodiment of communication system 100. The web portal 502 can be used for managing services of communication system 100. A web page of the web portal 502 can be accessed by a Uniform Resource Locator (URL) with an Internet browser using an Internet-capable communication device such as those described in FIG. 1. The web portal 502 can be configured, for example, to access a media processor 106 and services managed thereby such as a Digital Video Recorder (DVR), a VoD catalog, an Electronic Programming Guide (EPG), or a personal catalog (such as personal videos, pictures, audio recordings, etc.) stored at the wireless communication device 116. The web portal 502 can also be used for provisioning Internet services, provisioning cellular phone services, and so on.

The web portal 502 can further be utilized to manage and provision software applications 164-166 to adapt these applications as may be desired by subscribers and/or service providers of communication system 100. For instance, users of the services provided by the server 130 can log into their on-line accounts and provision the server 130 with user profiles, content preferences, parental controls rules, etc., and provide contact information to server to enable it to communication with devices described in FIG. 1, and so on. Service providers can log onto an administrator account to provision, monitor and/or maintain the communication system 100 of FIG. 1.

Figure 6:
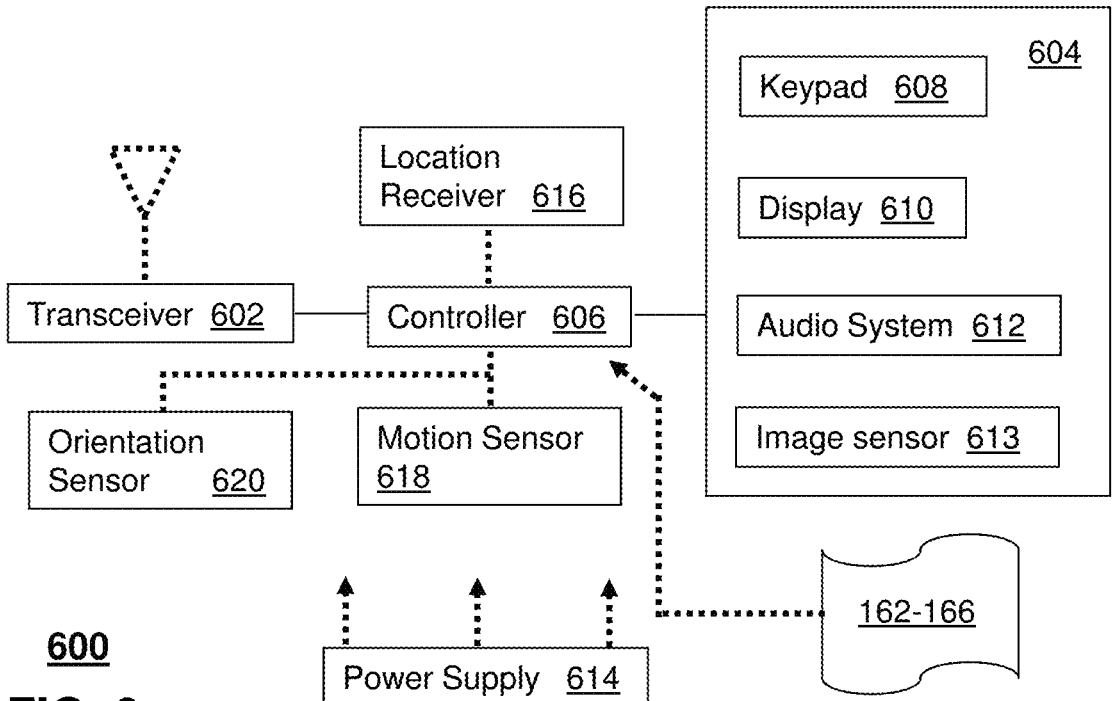
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and can be configured to perform portions of method 400 of FIG. 4. Communication device 600 may include, but is not limited to, a cellular handset, a personal digital assistant, or a wireless networking device.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 106, the media devices 108, or the wireless communication devices 116 of FIG. 1. It will be appreciated that the communication device 600 can also represent other devices that can operate in communication system 100 of FIG. 1 such as a gaming console and a media player. In addition, the controller 606 can be adapted in various embodiments to perform the functions 162-166, respectively.

Upon reviewing the aforementioned embodiments, it would be evident to an artisan with ordinary skill in the art that said embodiments can be modified, reduced, or enhanced without departing from the scope of the claims described below. For example, the transcoding, fragmenting, and manifest generating function 162 described above may be divided and implement among several devices illustrated in FIG. 1. In particular, such functions may be performed by media processor 108, which may stream content in an adaptive bitrate streaming fashion to wireless communication device 116. In addition, media processor 108 may implement the adaptive bitrate streaming functions 166 as function 164. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
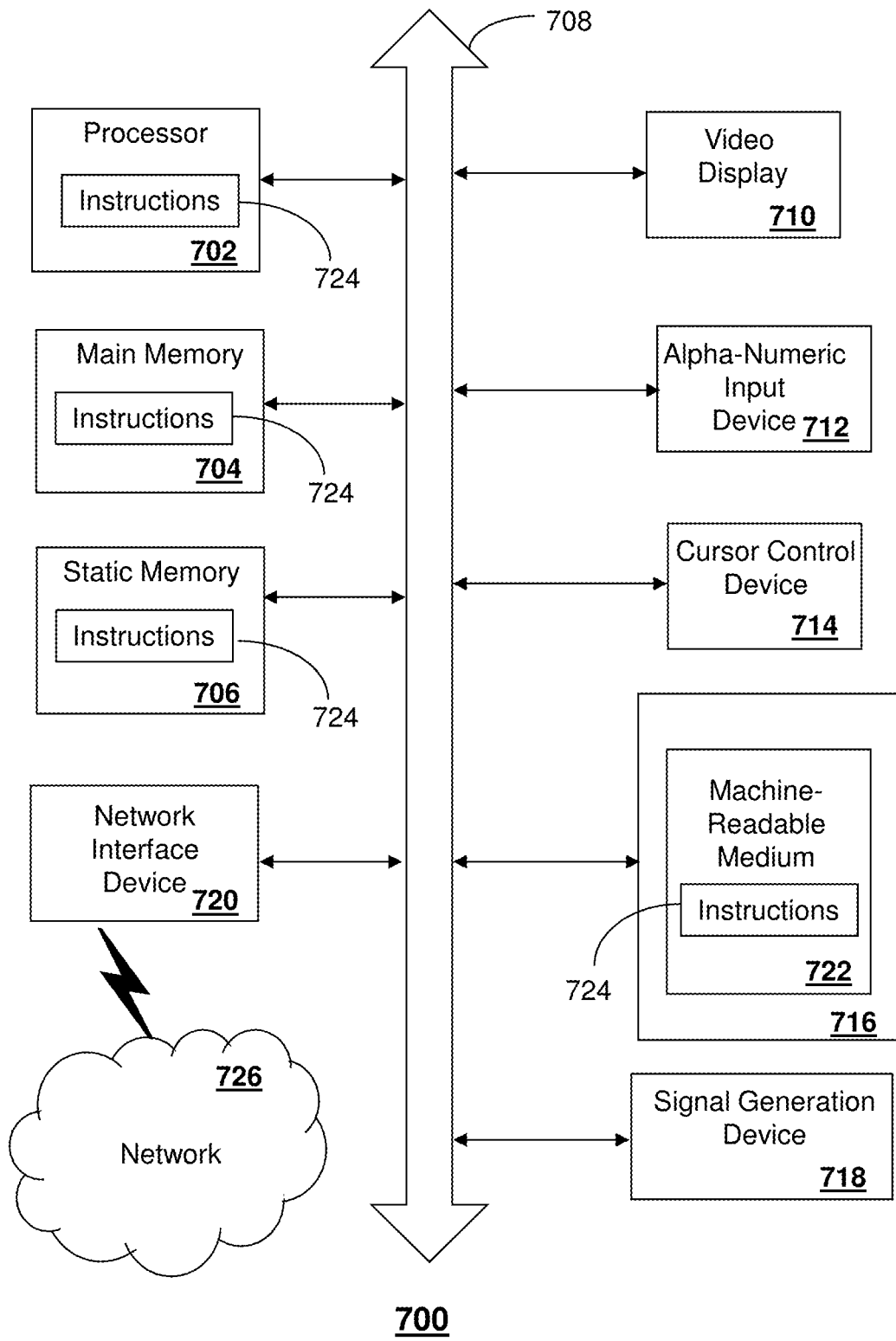
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the transcoder 130, the media devices 108, the wireless communication device 116, servers in the content delivery network 118 and other devices of FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media player comprising:
    a processing system including a processor; and
    a memory that stores executable instructions that, when executed by the processor, facilitate performance of operations, comprising:
        obtaining a manifest file for an adaptive bitrate media stream of media content, wherein the manifest file comprises: a uniform resource identifier identifying a chunk of the media content, a program change indicator identifying a program boundary between a first program and a second program within the chunk, and track information indicating durations of fragments of the chunk;
        receiving the chunk from a content delivery network, wherein the receiving the chunk is responsive to a request that is based on an available bandwidth associated with downloading data from the content delivery network;
        identifying the program boundary within the chunk based on detecting the program change indicator for the chunk; and
        displaying the chunk of the media content.

2. The media player of claim 1, wherein the operations further comprise determining whether to display a portion of the chunk after the program change indicator corresponding to the second program.

3. The media player of claim 2, wherein the determining is based on a restriction on the second program.

4. The media player of claim 3, wherein the operations further comprise blacking out a portion of the chunk after the program change indicator corresponding to the second program.

5. The media player of claim 3, wherein the operations further comprise switching to another stream after displaying a portion of the chunk before the program change indicator.

6. The media player of claim 5, wherein the another stream comprises a sponsored media or an advertisement.

7. The media player of claim 3, wherein the restriction is based on a parental controls of a program and wherein the operations further comprise blacking out the portion of the chunk after the program change indicator corresponding to the second program.

8. The media player of claim 1, wherein the program change indicator includes a timestamp that matches a scheduled time of the program boundary.

9. The media player of claim 1, wherein the media player comprises a cellular handset, a personal digital assistant, or a wireless networking device.

10. A non-transitory, machine-readable storage medium, comprising executable instructions that, when executed by a processor of a media player, facilitate performance of operations, comprising:

obtaining a manifest file for an adaptive bitrate media stream of media content, wherein the manifest file comprises: a uniform resource identifier identifying a chunk of the media content, a program change indicator identifying a program boundary between a first program and a second program within the chunk, and track information indicating durations of fragments of the chunk;

receiving the chunk from a content delivery network, wherein the receiving the chunk is responsive to a request that is based on an available bandwidth associated with downloading data from the content delivery network;

identifying the program boundary within the chunk based on detecting the program change indicator for the chunk; and displaying the chunk of the media content.

11. The non-transitory, machine-readable storage medium of claim 10, wherein the operations further comprise determining whether to display a portion of the chunk after the program change indicator corresponding to the second program.

12. The non-transitory, machine-readable storage medium of claim 11, wherein the determining is based on a restriction on the second program.

13. The non-transitory, machine-readable storage medium of claim 12, wherein the operations further comprise blacking out a portion of the chunk after the program change indicator corresponding to the second program.

14. The non-transitory, machine-readable storage medium of claim 12, wherein the operations further comprise switching to another stream after displaying a portion of the chunk before the program change indicator.

15. The non-transitory, machine-readable storage medium of claim 14, wherein the another stream comprises a sponsored media or an advertisement.

16. The non-transitory, machine-readable storage medium of claim 12, wherein the restriction is based on a parental controls of a program and wherein the operations further comprise blacking out the portion of the chunk after the program change indicator corresponding to the second program.

17. The non-transitory, machine-readable storage medium of claim 10, wherein the media player comprises a cellular handset, a personal digital assistant, or a wireless networking device, and wherein the processor comprises a plurality of processors operating in a distributed processing environment.

18. A method comprising:

obtaining, by a processing system including a processor, a manifest file for an adaptive bitrate media stream of media content, wherein the manifest file comprises: a uniform resource identifier identifying a chunk of the media content, a program change indicator identifying a program boundary between a first program and a second program within the chunk, and track information indicating durations of fragments of the chunk;

receiving, by the processing system, the chunk from a content delivery network, wherein the receiving the chunk is responsive to a request that is based on an available bandwidth associated with downloading data from the content delivery network;

identifying, by the processing system, the program boundary within the chunk based on detecting the program change indicator for the chunk; and displaying, by the processing system, the chunk of the media content.

19. The method of claim 18, further comprising determining, based on a restriction on the second program, whether to display a portion of the chunk after the program change indicator corresponding to the second program.

20. The method of claim 19, wherein the restriction is based on a parental controls of a program and wherein the method further comprises blacking out the portion of the chunk after the program change indicator corresponding to the second program.

* * * * *